(12) United States Patent
Gurin

(10) Patent No.: US 9,986,697 B1
(45) Date of Patent: Jun. 5, 2018

(54) HIGHLY INTEGRATED VERTICAL FARM FOR OPTIMAL MANUFACTURING AND OPERATIONS

(71) Applicant: Michael H Gurin, Glenview, IL (US)

(72) Inventor: Michael H Gurin, Glenview, IL (US)

(*) Notice: Subject to any disclaimer, the term of this patent is extended or adjusted under 35 U.S.C. 154(b) by 458 days.

(21) Appl. No.: 14/718,051

(22) Filed: May 20, 2015

(51) Int. Cl.
*A01G 31/00* (2018.01)
*A01G 31/06* (2006.01)
*A01G 7/04* (2006.01)

(52) U.S. Cl.
CPC .............. *A01G 31/06* (2013.01); *A01G 7/045* (2013.01)

(58) Field of Classification Search
CPC .. A01G 31/02; A01G 31/06; A01G 2031/006; A01G 7/045; A01G 27/001; A01G 27/006; A01G 27/02; A01G 9/022; A01G 9/023; A01G 9/027; A01G 9/104; A01G 9/1066
See application file for complete search history.

(56) References Cited

U.S. PATENT DOCUMENTS

| | | | | |
|---|---|---|---|---|
| 3,660,933 A * | 5/1972 | Wong, Jr. | ............... | A01G 31/02 239/428.5 |
| 4,163,342 A * | 8/1979 | Fogg | .................... | A01G 7/045 47/58.1 R |
| 4,170,844 A * | 10/1979 | Steele | ..................... | A01G 9/16 47/62 R |
| 4,584,791 A * | 4/1986 | Wolf | ..................... | A01G 31/02 47/48.5 |
| 4,937,969 A * | 7/1990 | Kawabe | ................ | A01G 31/02 135/94 |
| 2012/0054061 A1 * | 3/2012 | Fok | ....................... | A01G 31/00 705/26.5 |
| 2014/0259908 A1 * | 9/2014 | Halmos | ................. | A01G 31/02 47/60 |
| 2014/0366443 A1 * | 12/2014 | Brusatore | ............ | A01G 31/06 47/66.7 |
| 2015/0351329 A1 * | 12/2015 | Heidl | ..................... | A01G 9/023 211/49.1 |
| 2016/0014977 A1 * | 1/2016 | Esaki | ..................... | A01G 31/06 47/66.6 |
| 2016/0212945 A1 * | 7/2016 | Colless | ............... | A01G 9/1423 |
| 2016/0338276 A1 * | 11/2016 | Speidell | ................ | A01G 31/06 |
| 2016/0345518 A1 * | 12/2016 | Collier | ................... | A01G 9/143 |
| 2017/0099790 A1 * | 4/2017 | Gonyer | ................. | A01G 31/02 |
| 2017/0127628 A1 * | 5/2017 | Miyabe | ................. | A01G 31/06 |
| 2017/0172084 A1 * | 6/2017 | Fox | ........................ | A01G 31/06 |
| 2017/0223904 A1 * | 8/2017 | Raccanello | ............ | A01G 9/00 |
| 2017/0339846 A1 * | 11/2017 | Lawrence | ............... | A01G 9/24 |
| 2017/0354099 A1 * | 12/2017 | Haughton | ............... | A01G 9/20 |

* cited by examiner

*Primary Examiner* — Trinh T Nguyen

(57) ABSTRACT

The present invention is a highly automated vertical farm, grown hydroponically or aeroponically, generally within a closed container, such as a standard shipping container. The present invention utilizes superomniphobic and/or super hydrophobic coatings to decrease drag on NFT water flow and prevent biologic organism growth.

21 Claims, 13 Drawing Sheets

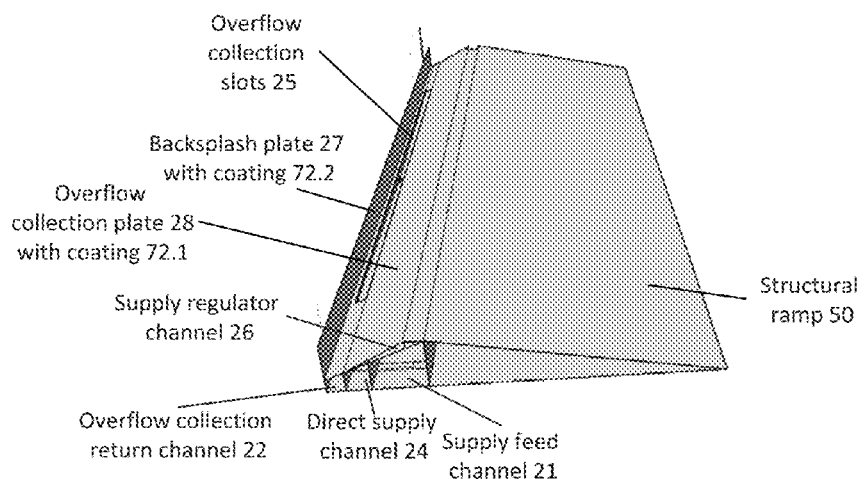
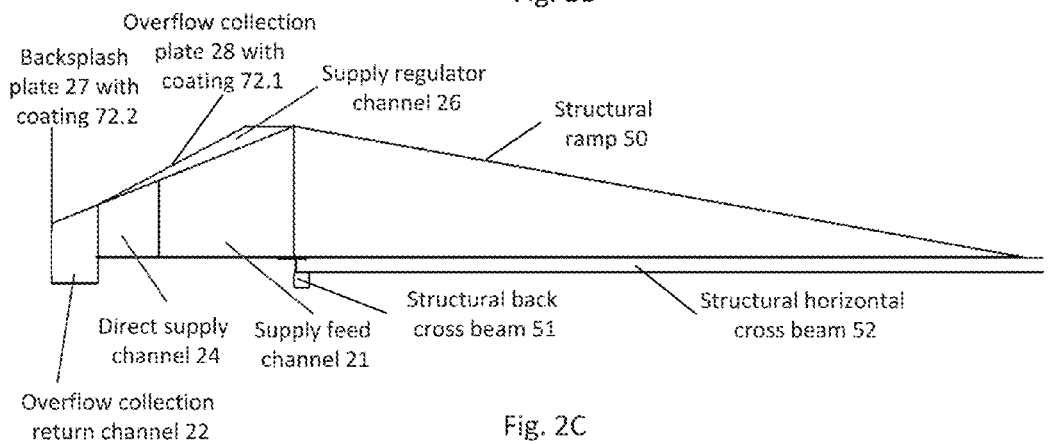
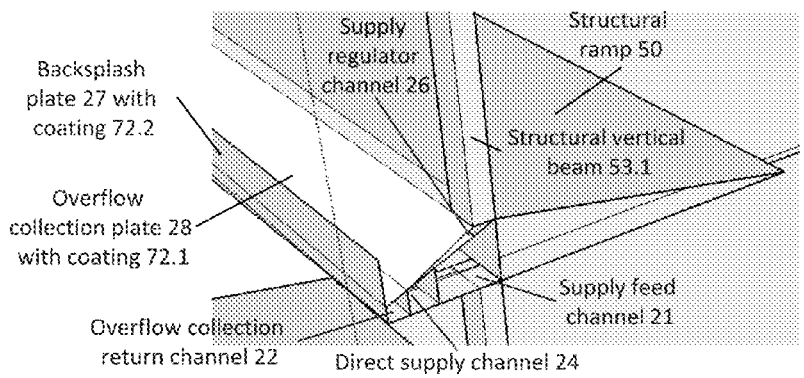

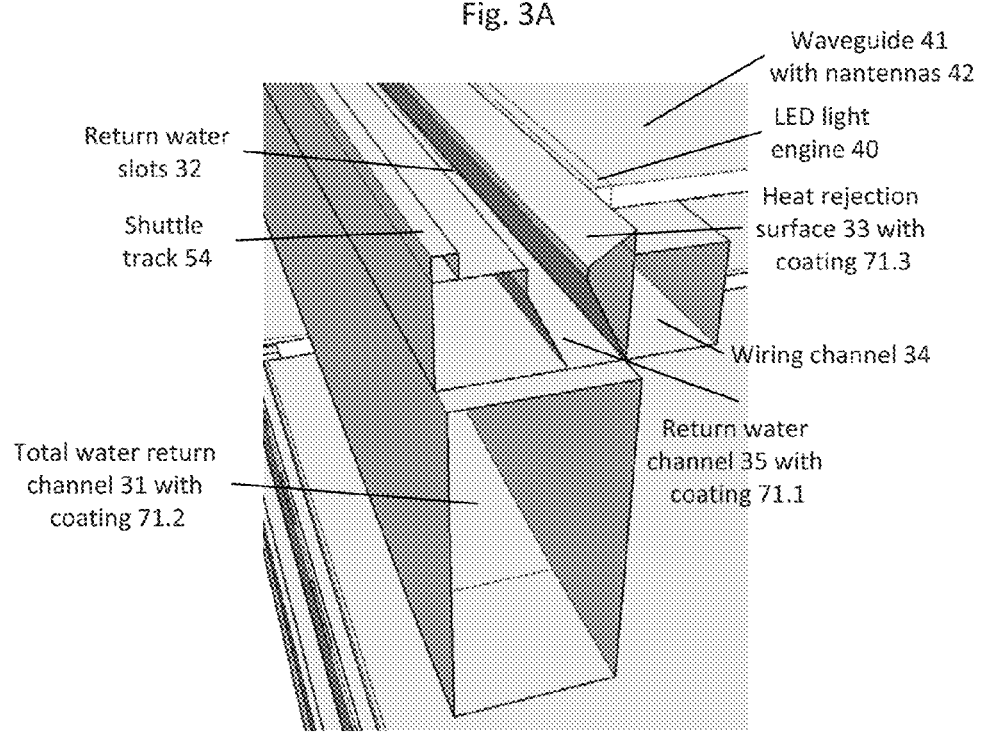
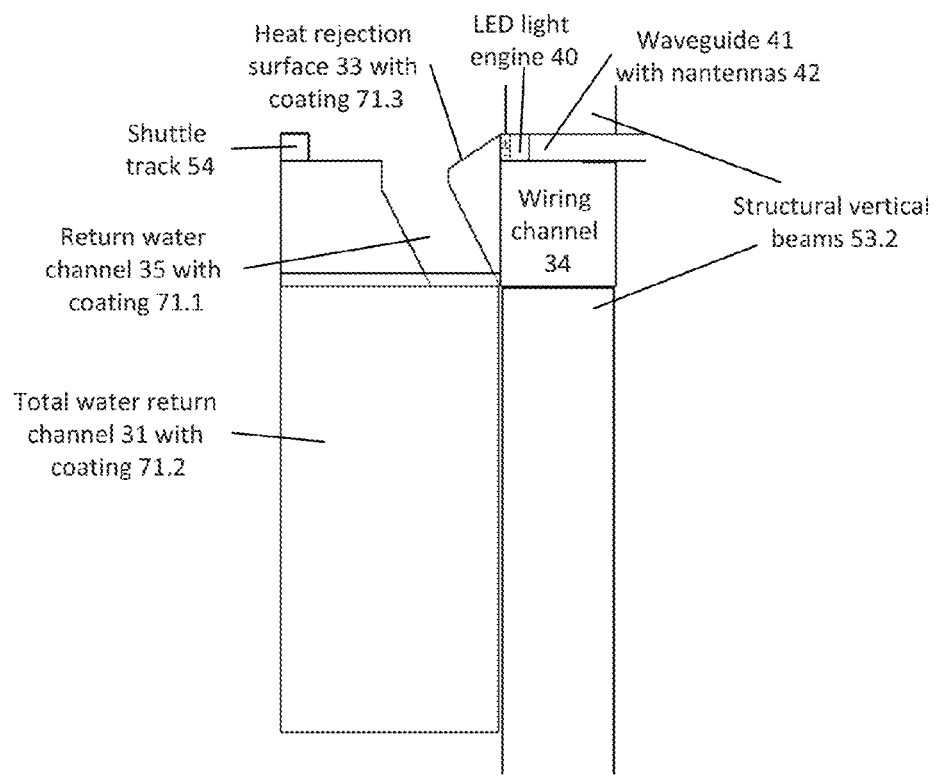

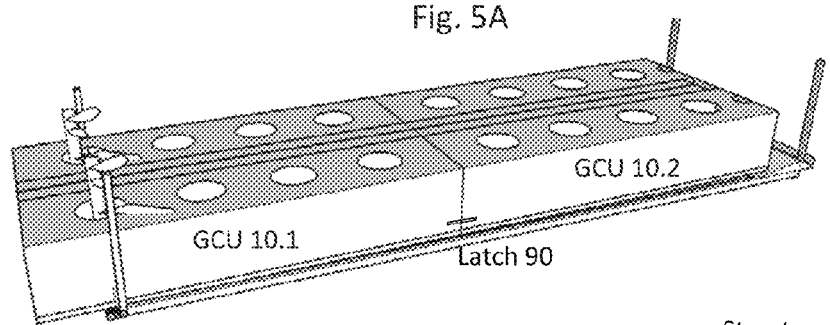
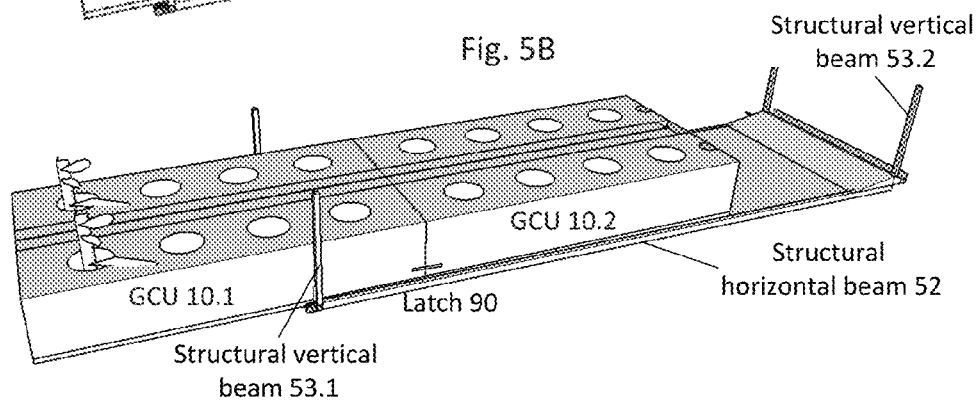
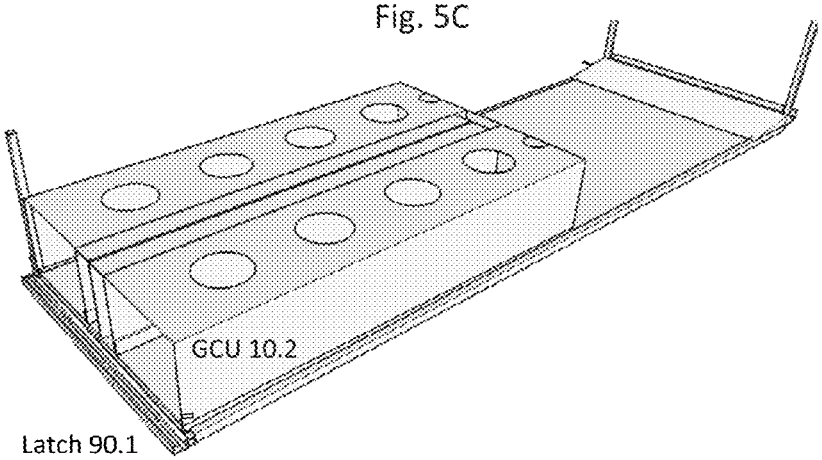
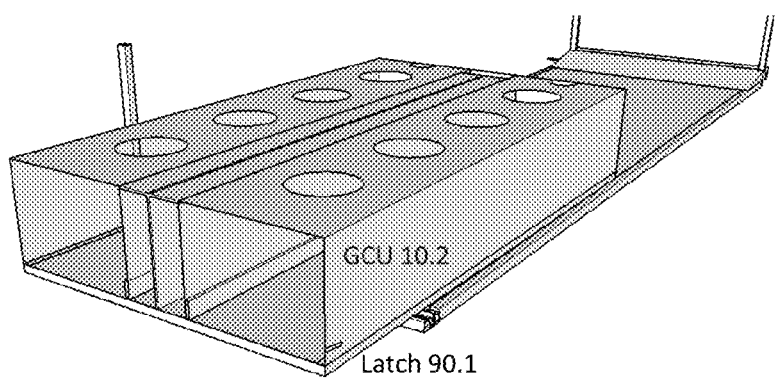

HIGHLY INTEGRATED VERTICAL FARM FOR OPTIMAL MANUFACTURING AND OPERATIONS

FIELD OF INVENTION

The present invention relates to vertical farms grown hydroponically or aeroponically, generally within an enclosed container (or any method of containment such as walls, ceiling, etc.), such as a standard shipping container, with significant automation.

BACKGROUND OF INVENTION

Due to a variety of factors including, but not limited to, global warming, resulting agricultural effects, such as increased drought and depleted arable land, and worldwide population growth, increasing the ability to grow food at high area density under stable and precisely controlled environment is important to sustaining a reliable food supply, while also utilizing significant automation in order to increase efficiency and reduce costs.

SUMMARY OF INVENTION

The present invention is a highly automated vertical farm, grown hydroponically or aeroponically, generally within a closed container, such as a standard shipping container. The present invention utilizes superomniphobic and/or super hydrophobic coatings to decrease drag on NFT water flow and prevent biologic organism growth.

BRIEF DESCRIPTION OF DRAWINGS

FIG. 2A, FIG. 2B, and FIG. 2C include schematics of the back extrusion.

FIG. 3A and FIG. 3B include schematics of the front extrusion.

FIG. 5A, FIG. 5B, FIG. 5C, and FIG. 5D shows the process for removing/inserting the growing container units.

GLOSSARY

Figure 1A:
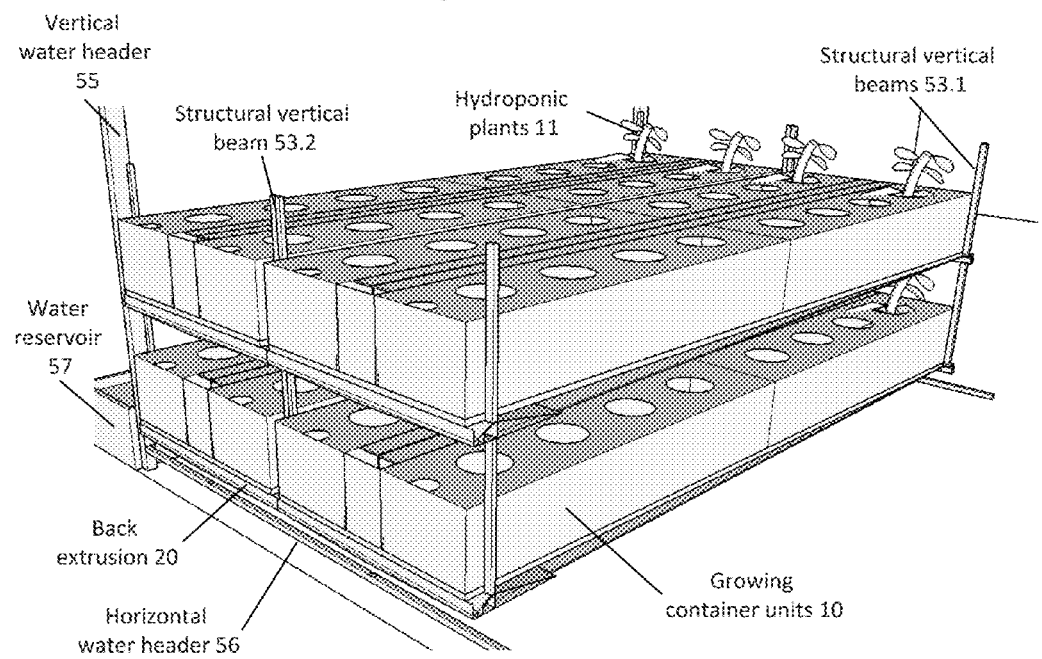
FIG. 1A and FIG. 1B are isometric overviews of the present invention.

The term "NFT" refers to "nutrient film technique," a process known in the art for growing food hydroponically.

The term "hydroponics" is a technique known in the art for growing food using a nutrient solution with water and without soil, and includes techniques such as NFT, aeroponics, ebb-and-flow, and others known in the art.

The term "superhydrophobic," as used herein, includes surfaces that display contact angles $\theta$ greater than 150°, along with a low contact angle hysteresis (the difference between the advancing and the receding contact angles) for water. Water droplets can easily roll-off from and bounce on such surfaces. Known superhydrophobic surfaces are textured (or rough), as the maximum water contact angle $\theta$ measured to date on a smooth surface is believed to be only about 130°. Superhydrophobic surfaces are pervasive in nature with various plant leaves, legs of the water strider, gecko's feet, troughs on the elytra of desert beetles, and insect wings displaying extreme water-repellency. Some synthetic or artificial engineered superhydrophobic surfaces have also been developed. These superhydrophobic surfaces tend to be quite difficult to reliably create, require complex processing and customized materials, and therefore have been quite expensive. It is understood in the context of this invention that hydrophobic coatings may be used, particularly when the coatings are formulated to reduce biofilm formation.

The term "superoleophobic," as used herein, includes surfaces that repel low surface tension liquids such as different oils. Furthermore, most superoleophobic surfaces are also superhydrophobic, because surfaces that can repel low surface tension liquids (such as oils and alcohols) can much more easily repel water, which possesses a higher surface tension. However, there are a few superoleophobic surfaces that are wetted by polar liquids such as water and alcohols. In view of such counter-intuitive surfaces, surfaces that can display both superhydrophobicity and superoleophobicity (eg as "omniphobic" surfaces) would be highly desirable. Similarly, an ability to create surfaces that exhibit other extreme wetting abilities, such as surfaces that are both superhydrophilic (eg displaying contact angles $\theta$ of less than 5° for water) and superoleophobic or superhydrophobic and superoleophilic (eg displaying contact angles $\theta$ of less than 5° for oil) would also be highly desirable. There remains a need for improved, streamlined, cost-effective processes for forming surfaces having such extreme wetting abilities that can be used in a vast array of different technological fields and applications.

The term "superomniphobic," as used herein, refers to super-repellant surfaces that display low contact angle hysteresis promoting easy roll off or bouncing of the contacting liquid droplets (Patent Literature (PL) 1 and 2). To create surfaces exhibiting superomniphobic properties, the surfaces have to display super-repellent features in terms of superhydrophobicity (contact angles>150°, contact angle hysteresis<5° with water) and superoleophobicity (contact angles>150°, contact angle hysteresis<5° with low surface tension, usually $\gamma_{LV}$<30 Nm/m$^2$, with liquids such as oils and alcohols). Surfaces that exhibit contact angles greater than 150° and low contact angle hysteresis for liquids with high or low surface tension energy are said to display extreme repellency. Such super-repellent surfaces fabricated by means of chemical or physical processes are one of the most sought after materials for various automotive, aviation, materials science, biomedical, electronics, corrosion, petrochemical, and other civilian and military applications. Of late, applications have been extended to self-cleaning, non-fouling, spill-resistant fabrics and protective wears, economic consumption of energy through drag reduction and facile heat treatment, fending volcanic dusts and harsh and chemicals. Superomniphobic surfaces are those that display both superhydrophobicity and superoleophobicity (PL 1, NPL 1). The two most common parameters used to measure the extent of liquid repellency are the contact angle and the contact angle hysteresis, which is the difference between advancing and receding contact angles. A surface is considered super-repellent when it exhibits very high contact angles that are greater than 150° and very low contact angle hysteresis that are usually smaller than 5°.

Superomniphobic surfaces display high contact angles that are greater than 150° and a very low contact angle hysteresis that is usually smaller than 5° for virtually all liquids, including low surface tension liquids (PL 1). Surfaces with hierarchical scales of texture (ie more than one length scale of texture) display higher contact angles and lower contact angle hysteresis with a contacting liquid by entrapping air at multiple length scales, thereby reducing the solid-liquid contact area.

Surfaces that display a contact angle of greater than or equal to about 90°, optionally greater than or equal to about 95°, optionally greater than or equal to about 100°, optionally greater than or equal to about 105°, optionally greater than or equal to about 110°, optionally greater than or equal to about 115°, optionally greater than or equal to about 120°, optionally greater than or equal to about 125°, optionally greater than or equal to about 130°, optionally greater than or equal to about 135°, optionally greater than or equal to about 130°, optionally greater than or equal to about 140°, and in certain aspects, optionally greater than or equal to about 145° with water or other polar liquids, and oils are considered to be "hydrophobic" and "oleophobic", respectively.

The term "beam shaping nano-antennas" are nanoscopic antennas that have the ability to redirect and/or concentrate energy or light beams to a desired location. In this embodiment, they are paired with an optical waveguide and light emitting diodes (LEDs) as known in the art, to provide reliable, low cost edge lighting for a diffused lighting effect.

DETAILED DESCRIPTION OF INVENTION

Here, as well as elsewhere in the specification and claims, individual numerical values and/or individual range limits can be combined to form non-disclosed ranges. Exemplary embodiments of the present invention will now be discussed with reference to the attached figures. Such embodiments are merely exemplary in nature. With regard to the figures, like reference numerals refer to like parts. The present invention refers to NFT process, although other methods such as aeroponics, ebb-and-flow, or other techniques known in the art are similarly applied.

Figure 1B:
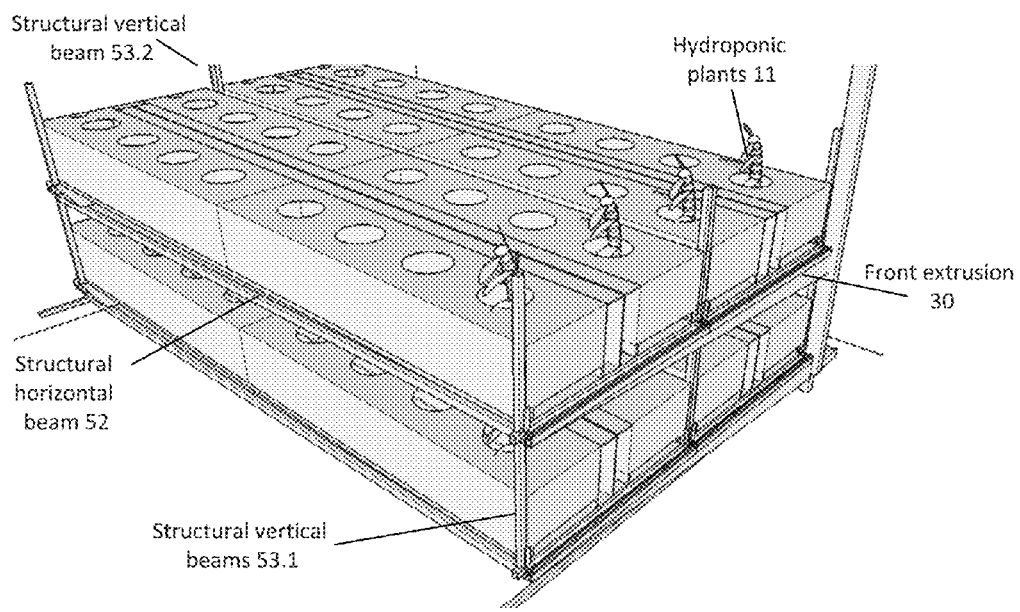

FIGS. 1a and 1b provides a general overview of the present invention from the back view and front view, respectively. The "front" being defined as from the perspective of insertion and "back" being defined as from the side of water supply. Each growing container unit, hereinafter also referred to as "GCU" 10 contains any number of hydroponic plants 11 and rests on the back extrusion 20 and front extrusion 30, as well as minimally at least one structural horizontal beam 52. Each structural vertical beam 53.2 and 53.1 provides structural support between each level in which growing container unit(s) 10 are growing. The dimensions of the GCU 10 are a function of the plants that are being grown within, the stage of growth of the plant, and architectural decisions as known in the art for the hosting building and its components are as known in the art to support a successful NFT operation. Water reservoir 57 holds the required water, nutrients, pump, etc, required for successful NFT operation, as known in the art, and also provides a buffer to enable smooth pumping and distribution of water. The water is distributed through the vertical water header 55 to each growing level/row.

FIGS. 2a and 2b provide general overviews of the back extrusion 20. FIG. 2a is an isometric view and FIG. 2b is from the side. The structural ramp 50 provides direct physical support when a GCU 10 is in operation for good water flow. The height and slope (and in fact the precise curvature/shape) of the structural ramp 50 is preferably such that it provides a smooth transition for each GCU 10 during insertion and removal in addition to the primary purpose of regulating the water flow rate through the GCU 10. It preferably provides a high enough angle to allow for gravity draining of the nutrient water. In the present invention, the angle needed for gravity flow is less than other technologies due to the inclusion of low biofilm adhesion coatings (that preferably are also superhydrophobic) on the inside (i.e., the water-facing) of each GCU 10. Nutrient water for supply to each GCU 10 flows first through the supply feed channel 21. Once the appropriate growing level has been reached, water flows into the supply regulator channel 26. Following the water flow pathway from the top of the supply feed channel 21 ensures an even flow distribution across the entire length serving the multiple growing container units 10 on the same level. Depending on the design flow rate required, the supply feed channel 21 can increase or decrease by altering the amount of space used below the structural ramp 50. In the current embodiment as shown in FIG. 2, the space underneath structural ramp 50 is empty (but can be solid or preferably further comprised of structural elements as known in the art of aluminum extrusions, but could also be filled with water by expanding the supply feed channel 21. Water flowing into the supply regulator channel 26 then flows into the direct supply channel 24, which is then distributed through direct supply slots 29 (not shown) into each GCU 10 on the level below. In the present invention, "slots" can refer to any shape drilled into the extrusion to provide flow through the material, but preferably either a rectangular or circular shape for easy manufacturing. All slots are designed for the specified flow rates and are preferably sized to provide steady even flow to the hydroponic plants 11 as known in the art.

A unique feature of the invention is the ability of the water flow to remain continuous, and not dependent on active flow control even when a GCU is not in the growing position. When the GCU 10 is not in its operating location, water will flow from the back extrusion 20 above the GCU 10 and still continue to flow for recirculation. In order to provide uninterruptible operation (without the addition of individual flow control regulators as known in the art), excess water in that instance will flow instead onto the overflow collection plate 28. Depending on the velocity and height of water stream, the water may bounce or splash onto the backsplash plate 27, which could be any height depending on the specific configuration, preferably with a height that it prevents splashing of water outside of the back extrusion 20. The backsplash plate 27 also functions as a mating/mounting plate with the external walls to provide additional structure and stability. The water then flows through the overflow collection slots 25 and into the overflow collection return channel 22, which directs water into the water reception slot 64.2 of the GCU 10 below (see FIG. 4a) or into the next overflow collection return channel 26 if the level below is also missing its GCU 10. If the bottom level is also missing its GCU 10, then water will flow directly into the horizontal water header 56, which returns to the water reservoir 57. The dimensions of the water reception slots 64 are preferably such that they are large enough that water is directed into them without splashing, allowing design flexibility in the instance where the GCU 10 is not inserted exactly correctly;

this will depend on the specific flow rates and design specifications. The dimensions of the water reception slots 64 are preferably accommodating variations in airflow within the system.

FIGS. 3a and 3b provide general overviews of the front extrusion 30. FIG. 3a is an isometric view and FIG. 3b is a side view. The automation shuttle moves along shuttle track 54. (The specific track shape will change based on what is required by the specific shuttle as known in the art, but an inherent feature of the invention is the direct integration into the front extrusion 30. The LED light engine 40 creates light into the waveguide 41 that is subsequently diffused with nantennas 42 as known in the art and shown in FIG. 11. The back of the LED light engine 40 is in thermal communication with a heat rejection surface 33 integral to the front extrusion 30 such that the nutrient water from the water discharge channels 65.1 and 65.2 (see FIG. 4b) provides cooling/heat removal through the heat rejection surface 33 and return water channel 35. The water flows through return water slots 32 into the total water return channel 31, which is a slanted channel that runs the entire length of the farm to migrate water to a vertical water header 55 for return to the water reservoir 57. The wiring channel 34 houses all wiring required for the LED light engine 40, sensors (not shown, but known in the art) and/or power for automation shuttle, protected from water flow but still taking advantage of thermal communication with heat rejection surface 33 for thermal management. FIG. 3b also shows structural vertical beams 53.2, which are the same as shown in previous figures.

In one embodiment, the LED light engine 40 could generate light constantly as known in the art. In another embodiment, the LED light engine 40 could generate light in a pulsating mode at kilohertz, megahertz to gigahertz frequencies, depending on the plant specific requirements and/or limitations. This could both save energy and reduce the thermal load of the LED light engine 40.

Figure 4A:
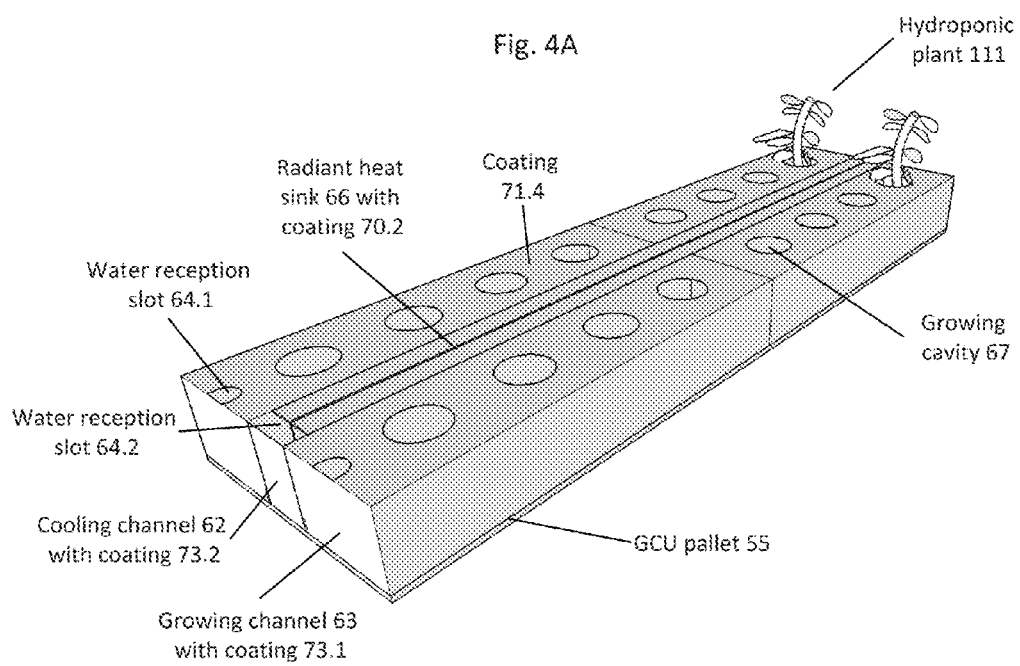
FIG. 4A and FIG. 4B include isometric overviews and frontal view of a growing container unit.
Figure 4B:
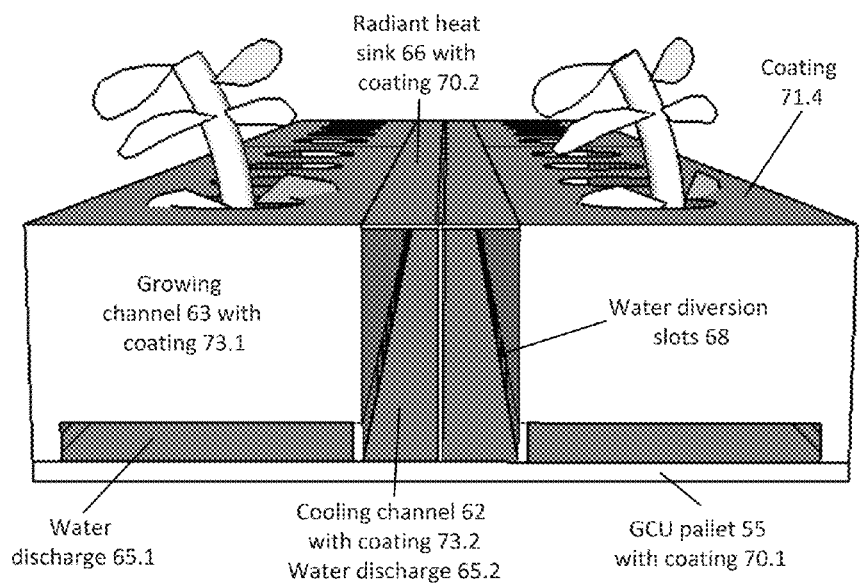

FIGS. 4a and 4b provide general overviews of the growing container unit 10. FIG. 4a is an isometric view and FIG. 4b is from the front view. The GCU pallet 55 provides structural support and one mode for the automated shuttle to provide an operational handle to move the GCU 10. In another embodiment, the GCU pallet 55 could have other accessories/designs for the automated shuttle to attach to in order to position/remove the GCU 10. The growing channels 63 house the hydroponic plants 11, which are grown through the growing cavity 67 as known in the art. In the middle of the GCU 10, in between the two growing channels 63, the cooling channel 62 provides radiant cooling to the growing channels 63 (which absorb heat from lighting losses "absorbed" and radiated from the hydroponic plants 11) through the thermal communication of the radiant heat sink 66 and nutrient water flow within all flow channels. In the embodiment shown, the radiant heat sink 66 is composed of flat components. In another embodiment, the materials could include heat-dissipating fins as known in the art in order to dissipate heat faster. Water diversion slots 68 provide a method to additionally regulate how much water flows through the cooling channel 62 compared relatively to the growing channel 63. The slots 68 allow for water to move between the channels and could be modified by dynamically changing the size of the slots as known in the art (not shown). A key feature of the invention is the water discharge 65.1 and 65.2 flowing over the LED light engine 40 as shown in previous figures. The minimum dimensions of each water discharge 65 is such that it preferably enables full water to surface interaction for thermal management and drainage from the channels 63, while keeping the roots system of the hydroponic plants 11 intact as known in the art.

FIGS. 5a-5d show the combined growing container units 10.1 and 10.2 in subsequent stages of removal/insertion. (Automated shuttle not shown). Another key feature of the invention is the ability of the growing container unit to be comprised of two interlocking halves to maximize plant growth per area. Providing the inventive interlocking halves for a growing container unit 10 reduces wasted space (by approximately 50%) within the shuttle transport center aisle (i.e., the shuttle must be able to move the GCU 10 through a center aisle, but if each GCU 10 is divided (e.g., in two) that is much less space required in the center aisle (e.g., halved). The subsequent interlocking of the two halves of the GCU during GCU placement into growing position also preferably better matches storage containers utilized within an automated storage retrieval system "ASRS" as known in the art of logistics. The utilization of the automated shuttle for the dual purpose of the vertical farm and ASRS is a key enabling feature for economic operation of the vertical farm, as the relatively low logistics requirement of the vertical farm provides for capital amortization from the combined logistics requirements of the relatively logistics requirement of the ASRS.

FIG. 5a shows the first stage of unit removal, while the back unit 10.2 is still slightly raised on the structural ramp 50. Both units remain attached via a latch 90. FIG. 5b shows the units still connected via the latch 90 but about ⅓ of the way down the level/shelf. FIG. 5c shows that the first half of the GCU 10.1 has been removed, leaving the second half of the GCU 10.2 at the front of the shelf with its half of the latch 90.1. FIG. 5d shows GCU 10.2 in the process of being removed from the shelf with only latch 90.1 left.

The sequence for insertion is the same as above, but in reverse. The two halves generally remain interlocked once adequate interlocking force is applied when the automated shuttle pushes the two halves together, but the locking mechanism 90 must be disengaged through an external device so as to ensure the two halves remain interlocked (to support fully automated operation in a fault-tolerant mode) except during removal of the GCU following plant growth stage.

FIG. 5b also shows the direct connection of structural horizontal beam 52 between structural vertical beams 53.1 and 53.2. A key design feature of the invention as shown is that no water (i.e., horizontal beam/spacer are void of water at least on all levels except for potentially the first/ground level) flows through the horizontal beam 52.

The present invention also includes application of various coatings known in the art applied uniquely in the disclosed invention. Coatings, preferably superhydrophilic, to minimize/eliminate splashing are applied on overflow collection plate 28 and backsplash plate 27. Coatings that reduce water flow drag (i.e., friction) and reduce/eliminate risk of biologic organism growth are applied on the heat rejection surface 33, all surfaces of the return water channel 35, and especially since this is going to be one of the hottest locations that is both open to light and water flow (i.e., which encourage biologic growth). Coatings that reduce water flow drag (i.e., friction) and reduce/eliminate risk of biologic organism growth are applied on the total water return channel 31, cooling channel 62, and growing channel 63, since this will have water that could potentially become contaminated from contact with the (biological and water exposed) roots of hydroponic plants 11. Coatings that repel any contamination, preferably low solid adhesion, are applied on most external surfaces, particularly the outward light-facing surface of the growing container unit 10, since that could potentially become contaminated from the leaves of the hydroponic plants 11.

Figure 6A:
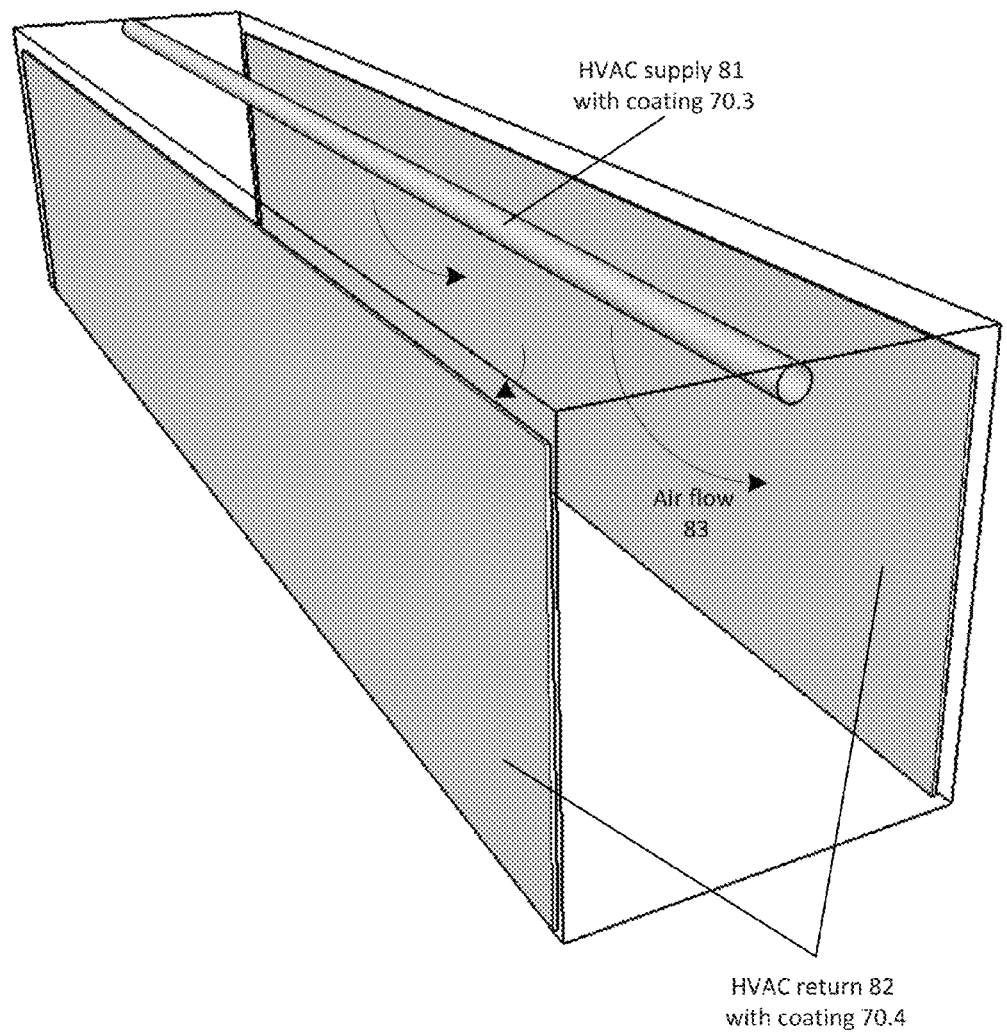
FIG. 6A and FIG. 6B illustrate the HVAC system.

FIG. 6a shows one embodiment of the HVAC system 80 within the farm container 17. The design of the present invention significantly reduces the air conditioning/cooling load of the hydroponic plants 11 and LED light engine 40 through the use of radiant cooling and cooling water flow 13. Thus the main requirement for the HVAC system 80 is the relatively minimal air changes such that the carbon dioxide and oxygen concentrations and humidity remain appropriately regulated for optimal plant growth as known in the art. In this embodiment, the HVAC supply 81 is in the center of the container 17. The HVAC return 82 is along the outer walls on the backside of the growing container levels/shelves. In one embodiment, the HVAC return 82 covers the entire wall as shown in the figure. This creates homogenous airflow with minimal velocity 83, moving from the front (within aisle) of each GCU 10 to the back. There are diverging opinions in the role of wind on plant growth, yet this design provides for even and homogenous airflow whether it be low-velocity on a regular basis or high-velocity on an intermittent basis. Airflow 83 can be increased in order to create more artificial wind as needed by the hydroponic plants 11. The creation of high-velocity as known in the art creates a sturdier plant for increased crispness, whereas physical stimulation of the plant has been demonstrated to reduce plant weight relative to the non-physical stimulation scenario.

Figure 6B:
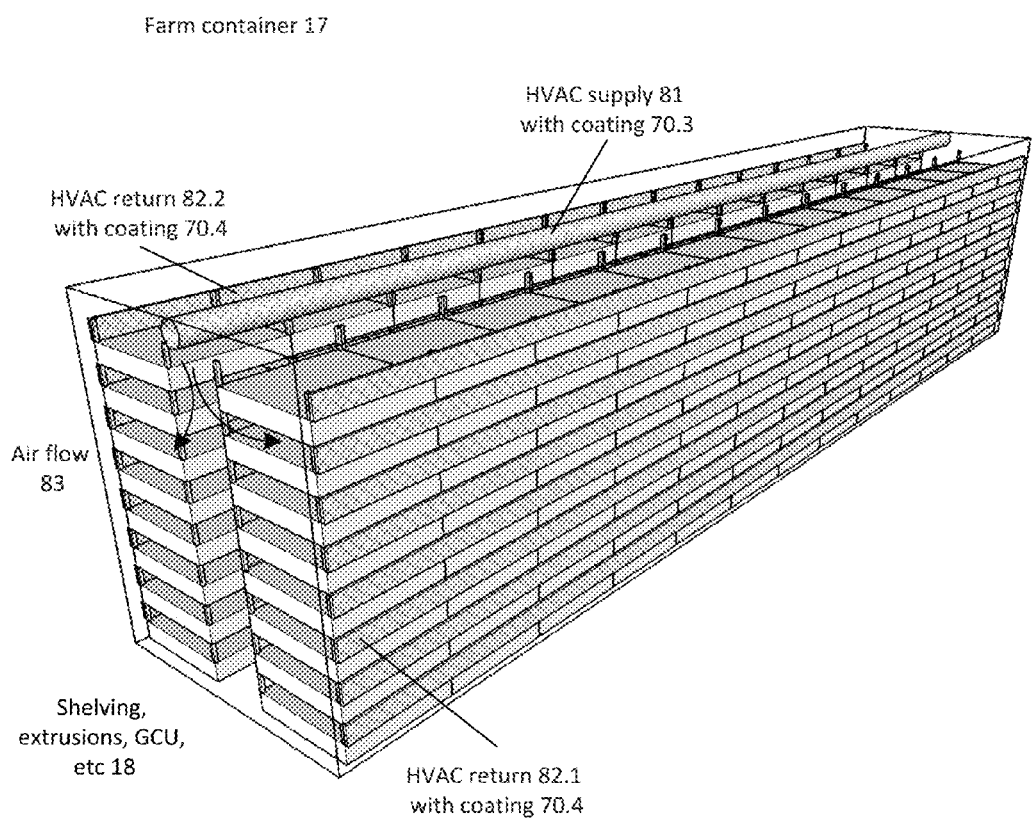

FIG. 6b shows another embodiment of the HVAC system 80 within the farm container 17. FIG. 6b shows the general area of levels/shelves, extrusions, GCU, etc 18 within the container 17 for reference. In this embodiment, the HVAC returns 82.1 and 82.2 are only in between each level/shelf 18 where airflow is possible (i.e., not next to the channels of the GCU 10).

In one embodiment, the HVAC supply 81 and return 82 are designed using textile air dispersion products as known in the art, protected with coating 70.3 and 70.4, respectively. This protects the textile from the high humidity and potential contamination from biologic organisms. The connection of the HVAC system 80 with the rest of the HVAC equipment is the same as obvious to those in the art. The HVAC system 80 must be designed to handle at least the air change required to maintain desired CO2 and O2 levels and humidity for the hydroponic plants 11. In another embodiment, the HVAC system 80 could be oversized to account for additional heat load to allow for different types of plants with varying lighting requirements (which is the dominant thermal load). A unique feature of the invention is the utilization of the back extrusion 20 as an integral structural element for the HVAC return 82 and the farm container (i.e., air containment) walls 17. The direct integration enables a reduction of dedicated structural elements for the HVAC components by at least 50%, preferably at least 80%, and particularly preferred at least 90%.

Figure 7A:
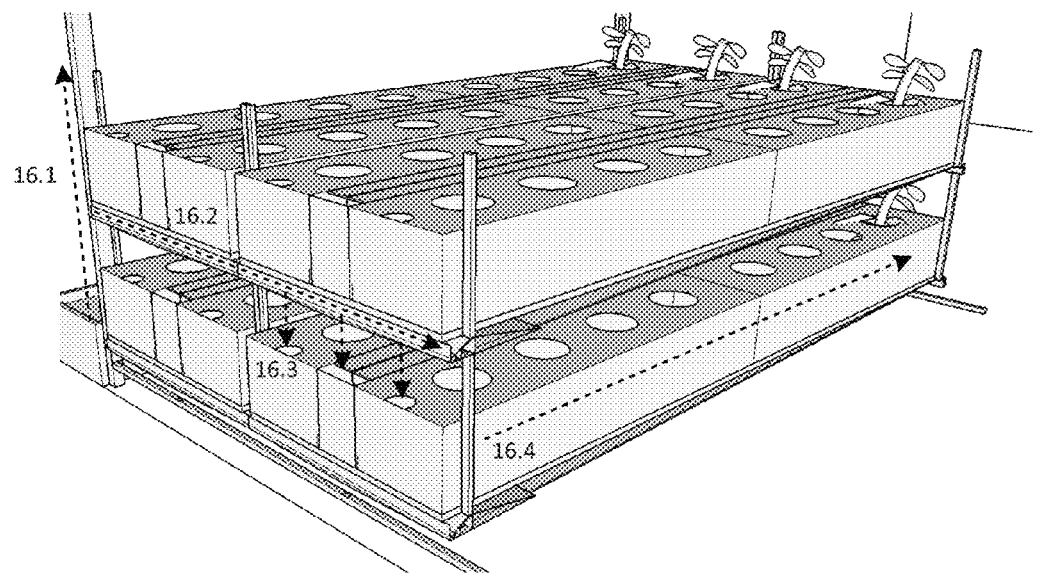
FIG. 7A and FIG. 7B include schematics of the water flow throughout the present invention.
Figure 7B:
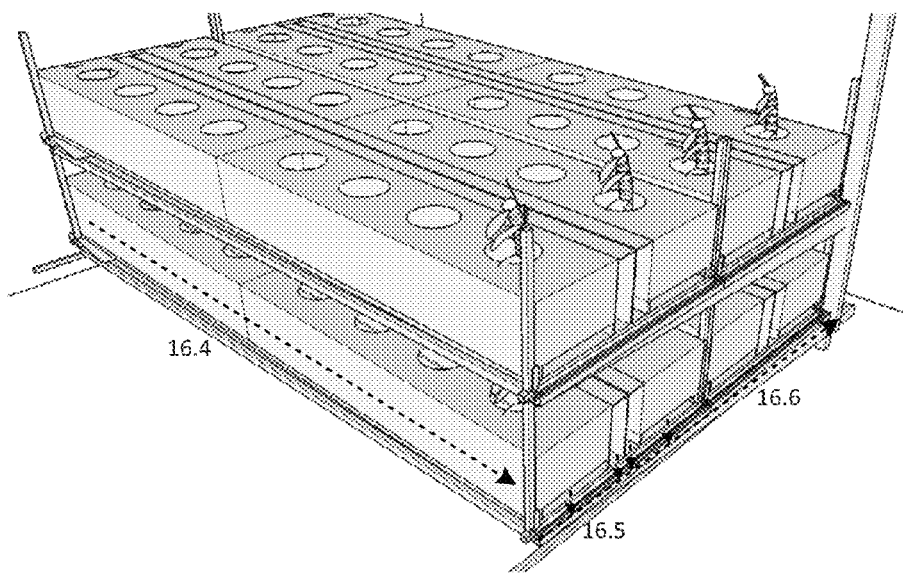

FIGS. 7a and 7b show the overall water flow 16. The images are the same as FIGS. 1a and 1b, but the labels have been left off for increased clarity. Water 16.1 begins at the water reservoir(s) 57 and moves up the vertical water header 55. After splitting off into each row/level, water 16.2 travels through the back extrusion 20 as shown in the figures. Water 16.3 drains out the direct supply channel 24 and in fluid communication into the water reception slot(s) 64.1 and 64.2. The waterfall effect of water 16.3 has two fundamental advantages with the primary being homogeneous flux rates across the entire length of the back extrusion 20 and the secondary being to increase the air absorbed into the water stream (i.e., film), increasing oxygen content, which is advantageous for hydroponic plant 11 growth. Water 16.4 travels via gravity and at higher velocities (i.e., lower drag losses for reduced pumping energy, particularly in the preferred embodiment where the pump has an integral regenerative method as known in the art to recover energy from the dropping water with a flow velocity attributed to the low drag/friction coating through the cooling channel 62 and growing channels 63. Water 16.5 travels out the water discharge 65.1 and 65.2 and into the front extrusion 30. Water 16.6 returns to the water reservoir 57 in the total water return channel 31.

In one embodiment, water 16 flows with a constant volumetric flow and velocity as known in the art. In yet another embodiment, water 16 flows in a pulsed manner such that the pump dynamically varies the required velocity or volumetric flow rate to maintain water and nutrient saturation on the plant roots 11. A pulsing flow rate, which may or may not be perceptible by a person or the plant, will save pump energy and/or water. The pulsing flow rate is preferably regulated by a control system to optimally control the volumetric flow rate required by the plant roots 11, while concurrently utilizing the pulsing to increase the velocity of the water flow to minimize biofilm formation. A traditional vertical farm with constant volumetric flow, or ebb & flow has no impact on biofilm formation as the water flow velocity is negligible.

Figure 8A:
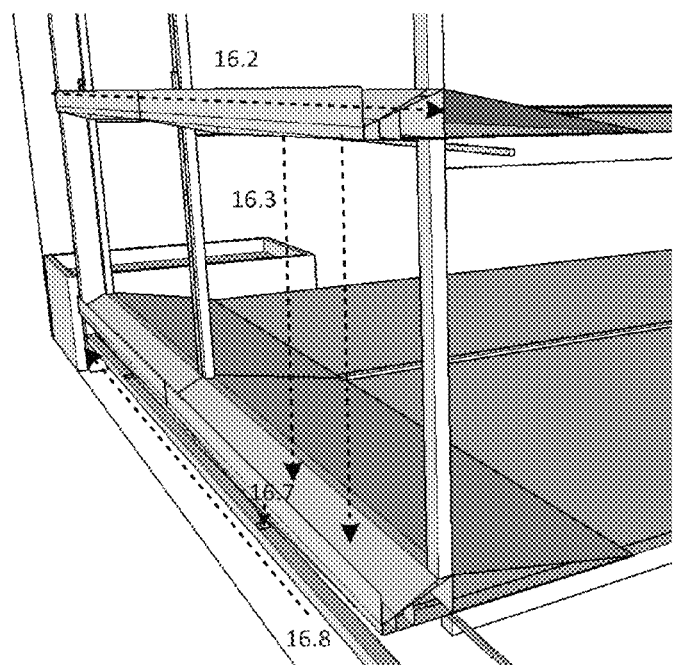
FIG. 8A and FIG. 8B include schematics of the water flow through the back extrusion and the present invention.
Figure 8B:
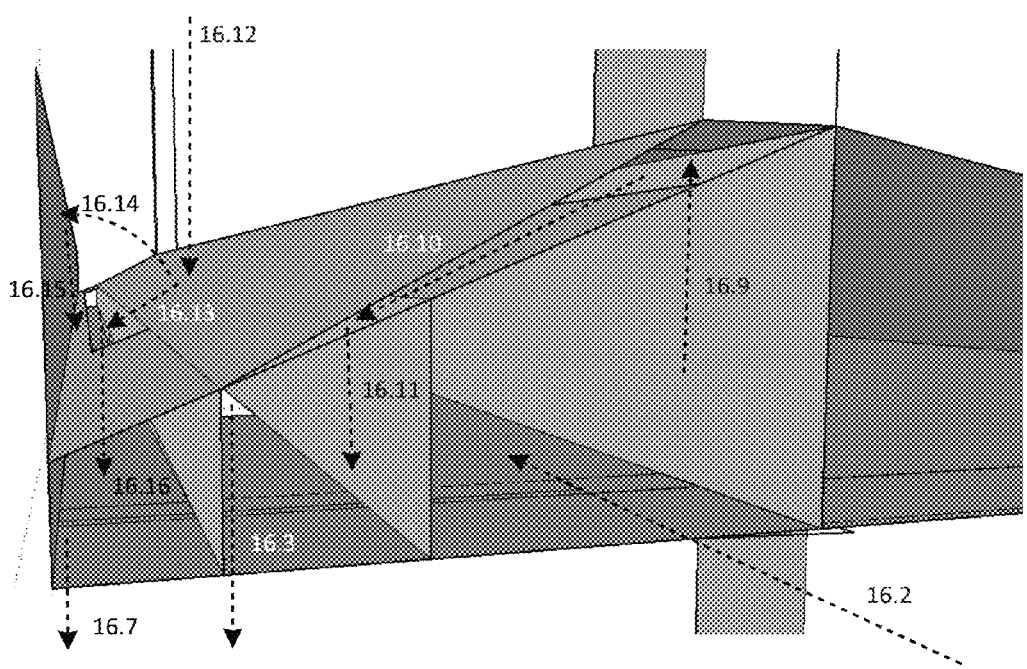

FIGS. 8a and 8b show the overall water flow 16 in the instance where the GCU 10 has been removed from the plant growing position. The images are the same as in FIG. 2, but the labels have been left off for clarity. A key feature of the present invention eliminates excess valves and controls that would otherwise be required in order to stop or divert water to prevent water overflow (or leakage, or loss) when the GCU 10 is removed from the plant growing position. The water 16.2 flows through the supply feed channel 21. Once the water reaches the appropriate level, water 16.9 flows into the supply regulator channel 26. Taking water 16.10 from the top of the supply feed channel 21 ensures an even flow distribution across the entire length of the growing container units 10. Water 16.11 flowing into the supply regulator channel 26 then flows into the direct supply channel 24, which water 16.3 is then distributed through direct supply slots 29 to the GCU 10 on the level below it. Water 16.12 then flows onto the overflow collection plate 28. Depending on the velocity and height of water 16.12, the water 16.14 may bounce or splash onto the backsplash plate 27 before water 16.15 flows back down to the overflow collection plate 28. The water 16.13 and/or 16.15 then flows through the overflow collection slots 25 and then water 16.16 flows into the overflow collection return channel 22, which directs water 16.17 into the water reception slot 64.2 of the GCU 10 below (see FIG. 4a) or into the next overflow collection return channel 26 if the level below's GCU 10 is not in its plant growing position. If the bottom level GCU 10 is also not in its plant growing position, then water 16.7 will flow directly into the horizontal water header 56, which returns water 16.8 to the water reservoir 57. The maximum height of the supply regulator channel 26 is such that water 16.10 can flow during normal operation and the minimum height is such that there is even distribution of water 16.11 and 16.3 throughout at the flow rate and velocity needed.

Figure 9:
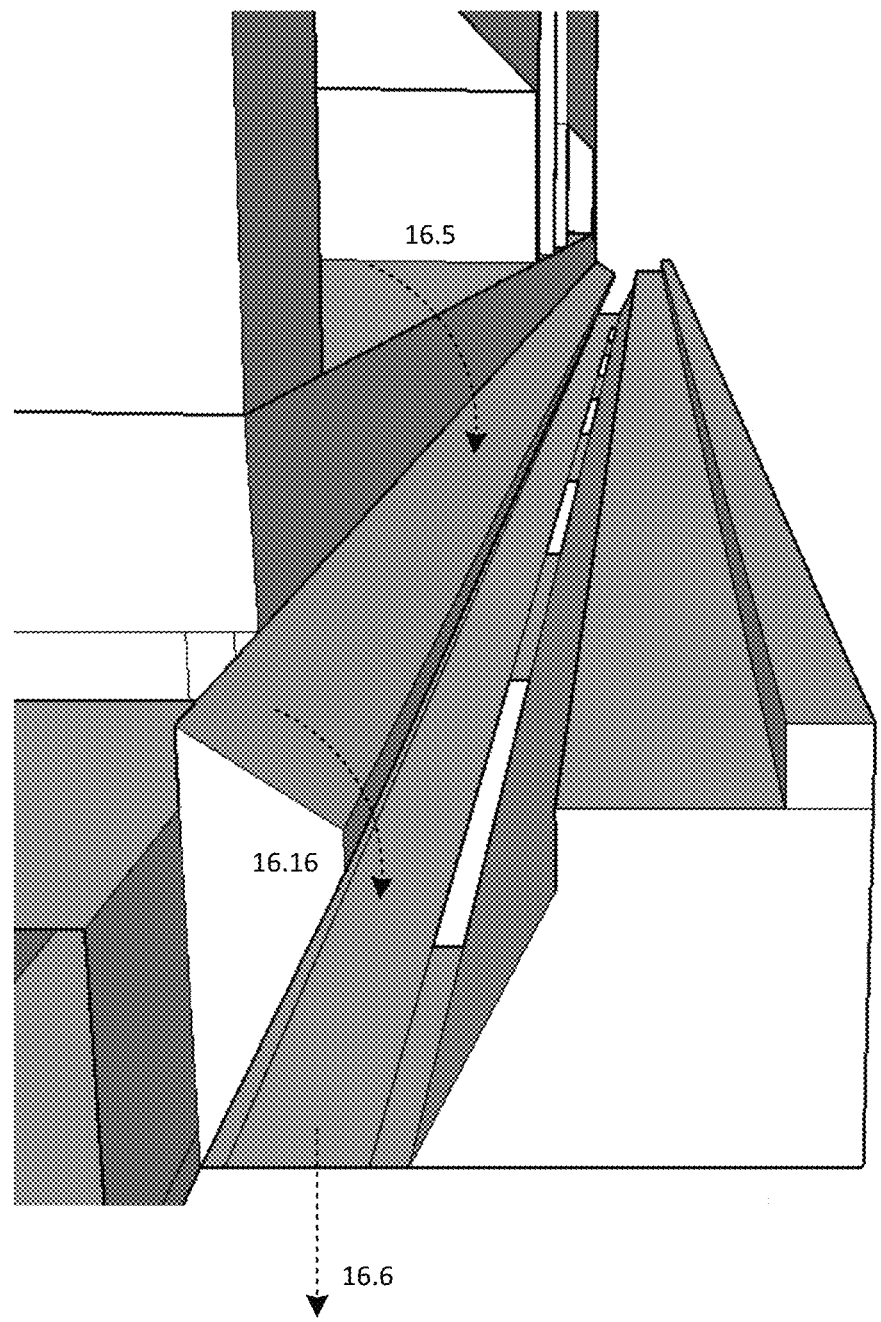
FIG. 9 includes schematics of the water flow through the front extrusion.

Once a GCU 10 is removed from its plant growing position, the LED light engine 40 supplying light (i.e., on the front extrusion above the GCU) can optionally be dimmed to compensate for the lack of water flowing from the water discharge 65 over the heat rejection surface 33, in order to prevent overheating. The controls may also have an automatic shutoff, or a feedback temperature sensor to prevent overheating of the LED junction temperature. FIG. 9 shows overall water flow 16 on the front extrusion 30. The water 16.5 from the water discharge 65.1 and 65.2 flow over the pallet 55. Then water 16.16 flows over the heat rejection surface 33 into return water channel 35. This maximizes the heat transfer from the LED light engine 40. Water 16.6 flow out through the return water slots 32.

Figure 10A:
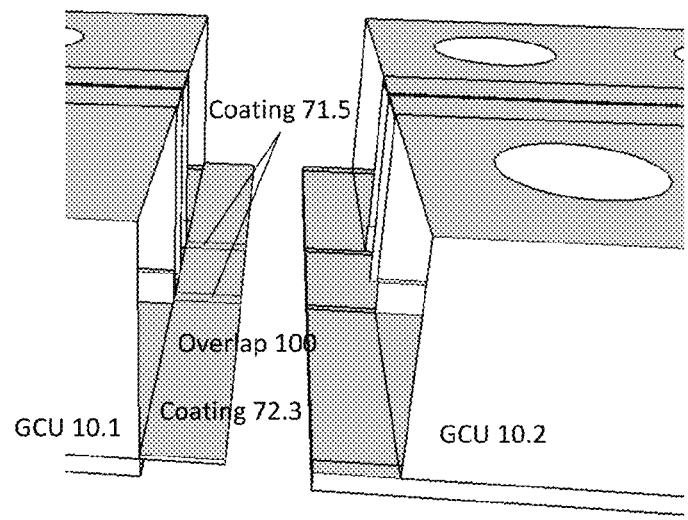
FIG. 10A, FIG. 10B, and FIG. 10C include schematics of the overlap between the two growing container units.
Figure 10B:
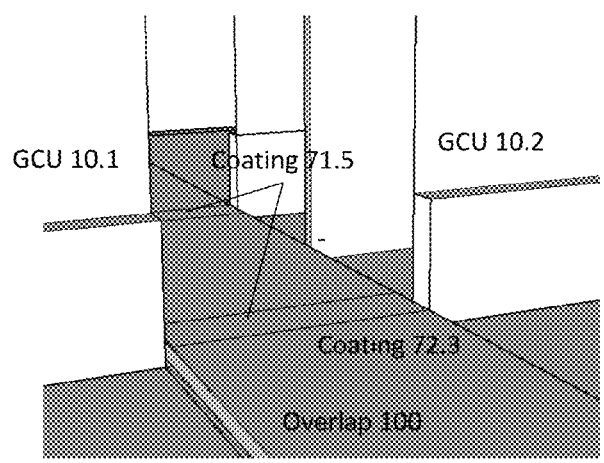
Figure 10C:
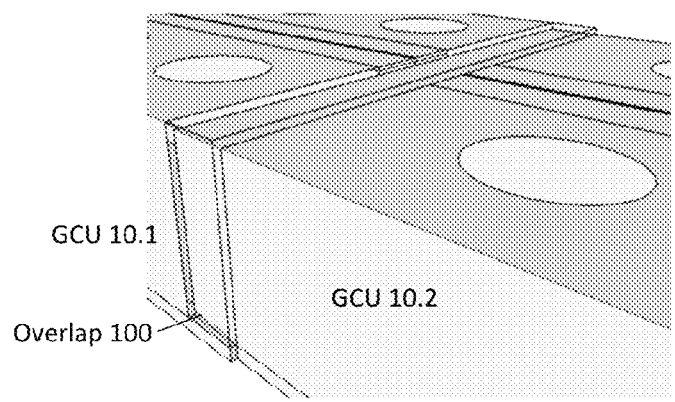

FIG. 10 shows the overlap 100 that prevents leaking water 16 flows between the two halves of GCU 10.1 and 10.2. The back GCU 10.1 is preferably slightly smaller than the front GCU 10.2 such that GCU 10.1 can nest inside GCU 10.2, preferably smaller by at least 0.1", or particularly preferred by at least 0.25" or 0.5" on each side to enable more margin for alignment error by the preferred automated shuttle or in case of human worker. In this embodiment, the entire GCU 10.1 could be smaller, could gradually taper, or have a reducing attachment. FIG. 10a shows the two GCU halves 10.1 and 10.2 separated such that overlap 100 is visible. In the preferred embodiment a larger tolerance is provided for during placement of GCU 10.2 where the overlap is void of physical walls to divide the cooling channel 62 and growing channels 63. Instead, the present invention utilizes a superhydrophobic coating 71.5 to achieve a virtual wall in the virtually identical manner where walls normally would be positioned to direct water flow and a superhydrophilic coating 72.3 elsewhere on the overlap 100 in order to encourage each water flow to remain in its channel. FIGS. 10b, and 10c show the same embodiment from inside the mated GCU halves 10.1 and 10.2 but from different viewpoints.

Figure 11:
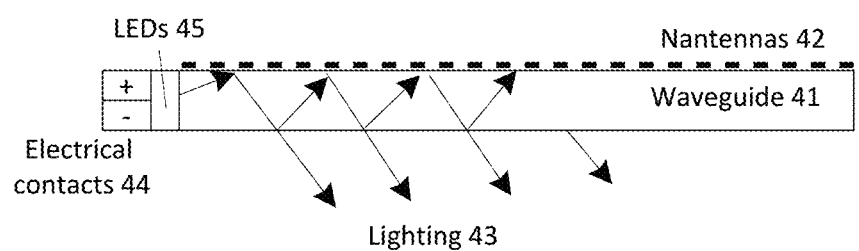
FIG. 11 is a schematic of the LED light engine integrated to create diffused lighting below it.

FIG. 11 is a schematic of prior art of the LED light engine 40, the technology that is generally known to those in the art. Electrical contacts 44 provide for the positive and minus power contacts for the LEDs 45. The LEDs 45 emit light 43 into the waveguide 41, which is redirected in a highly controlled angle by the nantennas 42 to emit from the waveguide 41 and to create diffused lighting 43, which illuminates the level of hydroponic plants 11 below it on the GCU 10.

FIG. 12 illustrates the present invention of the latch 90, which connects GCU halves 10.1 and 10.2 during insertion and removal (as shown in FIG. 5). Insertion is defined in this embodiment as moving towards the position for normal operation in the plant growing position and removal is defined in this embodiment as moving towards the center aisle typically done when the plants have reached their desired growth. FIG. 12a shows the female latch 90.2, which is part of the back GCU half 10.2 (i.e., the one that first receives the water supply). FIG. 12b shows the male latch 90.1, which is part of the front GCU 10.1 (i.e., the one that discharges the water).

Figure 12A:
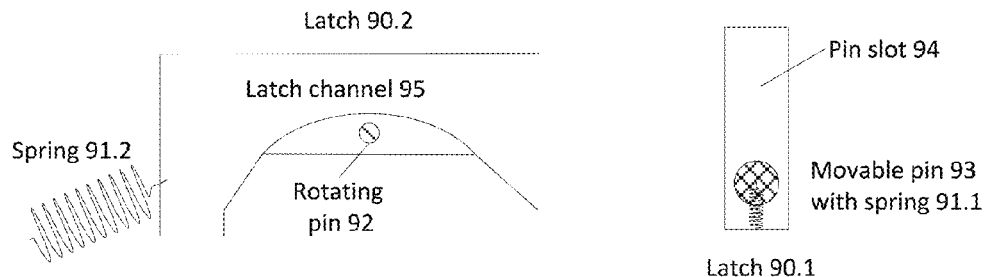
FIG. 12A, FIG. 12B, FIG. 12C, FIG. 12D, FIG. 12E, FIG. 12F, and FIG. 12G include schematics of the latching mechanism that keeps the growing container units together.
Figure 12B:
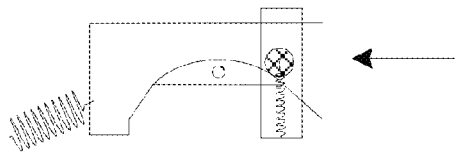

Female latch 90.2 is held to GCU half 10.2 by the rotating pin 92, which also lets the latch channel 95 rotate. The spring 91.2 is also attached to GCU half 10.2 and helps the latch channel 95 return to a desired equilibrium position at rest. Male latch 90.1 is made of a pin slot 94, in which the movable pin 93 can slide up and down. The movable pin 93 is attached to spring 91.1 to help it return to a desired equilibrium position at rest. Two embodiments are shown in FIG. 12b, wherein spring 91.1 can be either attached to the bottom of the pin slot 94 or on the side at the bottom. The preferred embodiment is to have it on the side near the bottom because it makes it easier to roll the movable pin 93 out of the latch channel 95 during removal from the plant growing position. Both springs 91.1 and 91.2 are shown in this embodiment, but are optional for added stability and not required for operation.

Figure 12C:
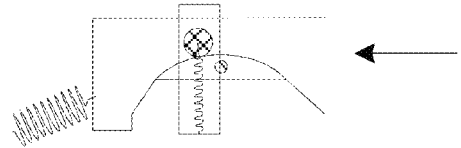

FIG. 12c shows the first step for linking GCU halves 10.1 and 10.2, which occurs when the automated shuttle begins to push the two together, in which male latch 90.1 begins to enter the female latch channel 95. As GCU half 10.1 moves forward, the movable pin 93 is pushed through the latch channel 95 as shown.

Figure 12D:
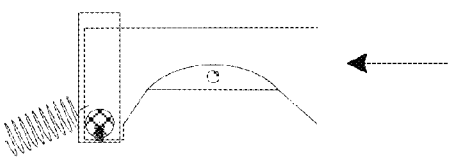
Figure 12E:
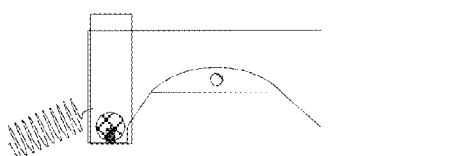

FIG. 12d shows the continued movement of the movable pin 93 within the latch channel 95. FIG. 12e shows the last step during linking of GCU halves 10.1 and 10.2, in which the movable pin 93 is held in the bottom of the latch channel 95.3. As shown in FIG. 12e, the movable pin 93 remains in the bottom of the latch channel 95.3 during normal operation, while GCU 10.1 and 10.2 are linked. It is understood that the latching method of the invention can be for GCU halves 10.1 and 10.2 to each other, or to any adjacent containers (and preferably storage containers of a standardized size).

Figure 12F:
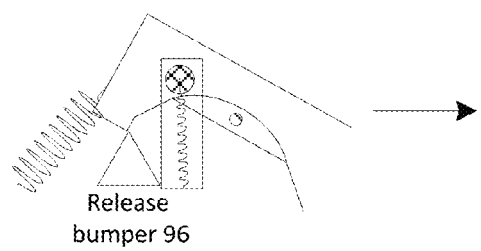

FIG. 12f shows the latch 90 during one embodiment for disengaging the latch mechanism. The release bumper 96.1 is not connected to any of the moving pieces (such as a GCU 10), but rather preferably on the structural horizontal beam or close by such that the release bumper 96.1 is in the way (physical interaction) of female latch 90.2 during movement of the GCU such that the release takes place at the precise location in which the back GCU half "parks" for subsequent movement by the automated shuttle. The release bumper 96.1 is a "one way" block—that is, as the male latch 90.2 moves in the insertion direction, the bumper 96.1 collapses so that it does not interfere in the GCU or latch movement; however, when the female latch 90.2 is moving in the removable direction, the release bumper 96.1 does not collapse in order to disengage the latch 90.

In this embodiment, while the GCU half 10.1 is moving outwards, the release bumper 96.1 triggers the latch channel 95 to tilt towards the movable pin 93 to exit the latch channel 93, all while the automated shuttle continues to simply pull the GCU half 10.1 out, maintaining its horizontal orientation.

Figure 12G:
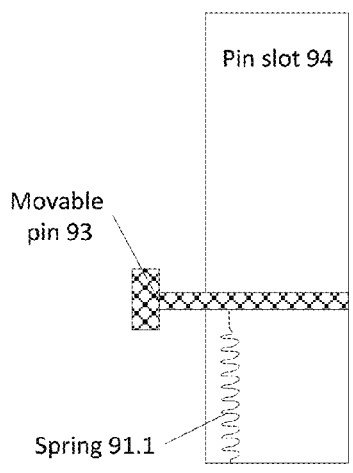

FIG. 12g shows another embodiment of the present invention for removal of the latch 90.1. The release bumper 96.2 is still a "one" way block, but instead of pushing up/tilting latch channel 95, it pushes up the pin slot 94, which raises the movable pin 93 above the minimum height to continue out of the latch channel 95 while the automated shuttle continues to remove GCU 10.1.

FIG. 12h shows a detailed side view of latch 90. The movable pin 93 sits outside the pin slot 94 such that it can slide within the latch channel 95 of female latch 90.2 of GCU 10.2. The movable pin 93 is held within the pin slot 94 by the movable pin axle 98 and returned to equilibrium position by gravity and optional spring 91.1.

FIGS. 12a-12d illustrate the positions of the movable pin 93 during insertion and removal (also referred to as unlatching). As noted, the release bumper 96 is only active when moving in the removal direction.

The minimum length of the latch channel 95.2 is such that it is lower, preferred to be lower by at least by 0.01" or within machine tolerance, than the resting level of the movable pin 93 so that the movable pin 93 is capable of rolling into the latch channel inlet 95.2 when it is pushed for insertion. The minimum height of the release bumper 96.1 is preferably lower than the rotating pin 92 mechanism such that it can still remain under the female latch 90.2 and sufficiently high to push it up beyond the latch channel bottom 95.3. The maximum height of the release bumper 96.1 is preferably such that the latch channel 95 returns to its rest orientation after the GCU half 10.2 passes over it and preferably such that the movable pin 93 rolls out of the latch channel 95 in a controllable matter, i.e., not "catapulted" out due to the release bumper 96.1 being too high or the slope being too high. The minimum height of the release bumper 96.2 is preferably such that it raises the movable pin 93 sufficiently to roll out of the latch channel 95. The maximum height is preferably such that the movable pin 93 rolls out of the latch channel 95 in a controllable matter, i.e., not "catapulted" out due to the release bumper 96.2 being too high or slope being too high. The shape of the latch channel 95 depends on the specific design requirements, such as weight and dimensions of the growing container units 10. The curved shape (i.e., slopes within) of the latch channel 95 is preferably such that the movable pin rolls with minimal resistance and evenly through the latch channel 95 while being simultaneously pulled in one direction by the automated shuttle.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A vertical farm system comprised of:
    an least two growing levels whereby each of the at least two growing levels is further comprised of an at least one upper level and at least one lower level;
    a water circulation loop with a water flow through a water supply component to the at least two growing levels from the at least one upper level to the at least one lower level and a water return component from the at least one lower level;
    whereby the at least one lower level is further comprised of a first back horizontal extrusion, a first horizontal growing container and a first front horizontal extrusion;
    whereby the at least one upper level is further comprised of a second back horizontal extrusion, a second horizontal growing container and a second front horizontal extrusion;
    whereby the first horizontal growing container is above the first front horizontal extrusion and the first back horizontal extrusion;
    whereby the second horizontal growing container is above the second front horizontal extrusion and the second back horizontal extrusion;
    whereby the at least one upper level is above the at least one lower level and the first horizontal growing container is below the second horizontal growing container;
    whereby the first horizonal growing container is in a first position when the first horizontal growing container is directly below the second back horizontal extrusion;
    whereby the first horizontal growing container is in a second position when the first horizontal growing container is removed away from being directly below the second back horizontal extrusion;
    whereby the first horizontal growing container and the second horizontal growing container is further comprised of an at least one plant that grows through photosynthesis;
    whereby the water flow is also a nutrient delivery system;
    whereby the vertical farm system is further comprised of an aisle for removal of the first horizontal growing container from the first position to the second position;
    whereby the vertical farm system with the first horizontal growing container in the first position has the water flow from the second back horizontal extrusion to the first horizontal growing container and then from the first horizontal growing container to the first front horizontal extrusion, and wherein the second back horizotal extrusion is the water supply component and the first front horizontal extrusion is the water return component; and
    whereby the vertical farm system with the first horizontal growing container in the second position has the water flow from the second back horizontal extrusion to the first back horizontal extrusion, and wherein the second back horizontal extrusion is the water supply component and the first back horizontal extrusion is the water return component.

2. The vertical farm system according to claim 1 whereby the first back horizontal extrusion is further comprised of an integral structural ramp, and whereby the first horizontal growing container is raised on the integral structural ramp.

3. The vertical farm system according to claim 2 whereby the first back horizontal extrusion is further comprised of an overflow collection plate to divert the water flow when the first horizontal growing container is removed from the first position.

4. The vertical farm system according to claim 3 whereby the overflow collection plate is further comprised of a superhydrophilic coating reducing the water flow from splashing away from the first horizontal back extrusion.

5. The vertical farm system according to claim 3 whereby the overflow collection plate diverts water into an overflow collection return channel having at least a partial opening toward the first back horizontal extrusion.

6. The vertical farm system according to claim 3 whereby the overflow collection plate diverts water from the second back horizontal extrusion into an overflow collection return channel having an opening toward the second back horizontal extrusion.

7. The vertical farm system according to claim 4 whereby the overflow collection plate diverts water from the second back horizontal extrusion into an overflow collection return channel having at least a partial opening toward the first back horizontal extrusion.

8. The vertical farm system according to claim 1 whereby the first back horizontal extrusion is further comprised of a water supply feed channel.

9. The vertical farm system according to claim 8 whereby the second back horizontal extrusion is further comprised of a supply regulator channel and a water direct supply channel to distribute the water flow to the first horizontal growing container through the second back horizontal extrusion, and whereby the water flow is in fluid communications from the water supply feed channel and the supply regulator channel.

10. The vertical farm system according to claim 9 whereby the water flow through the supply regulator channel is in fluid communications from the top of the supply feed channel through the bottom of the water direct supply channel providing a consistent water flow rate across an entire length of the second back horizontal extrusion.

11. The vertical farm system according to claim 1 whereby the second front horizontal extrusion is further comprised of an LED having a lighting intensity and an integral LED heat sink, whereby the integral LED heat sink is in thermal communication with the water flow from the second horizontal growing container then through the second front horizontal extrusion, and a whereby the vertical farm system is further comprised of a control system regulating the water flow rate and the LED lighting intensity.

12. The vertical farm system according to claim 11 whereby the integral LED heat sink has an LED array having an LED junction temperature and emitting a light into a light waveguide whereby the light is distributed into the first horizontal growing container, and whereby the light intensity is reduced to prevent the LED junction temperature from overheating when the first horizontal growing container is removed from the first position.

13. The vertical farm system according to claim 1 is further comprised of a shuttle on an integral shuttle track wherein the integral shuttle track is on the first front horizontal extrusion to at least place or remove the first horizontal growing container respectively to or from the first position.

14. The vertical farm system according to claim 1 whereby the second front horizontal extrusion is further comprised of an integral return water channel and whereby the integral return water channel has at least a partial opening toward the second front horizontal extrusion.

15. The vertical farm system according to claim 14 whereby the integral return water channel has at least a partial opening toward the first front horizontal extrusion.

16. The vertical farm system according to claim 1 whereby the first back horizontal extrusion and the first front horizontal extrusion are both continuous extrusions having a length of the full length of the vertical farm system.

17. The vertical farm system according to claim 1 further comprised of at least one horizontal spacer providing a structural support of the first horizontal growing container, whereby the at least one horizontal spacer is in structural communications with both the first back horizontal extrusion and the first front horizontal extrusion.

18. The vertical farm system according to claim 17 whereby the at least one horizontal spacer is void of ware flow.

19. The vertical farm system according to claim 1 whereby a back of the vertical farm system is closest to the first position and a front of the vertical farm system is closes to the second position, whereby the vertical farm system is further comprised of a floor level horizontal water pipe in fluid communications between the back of the vertical farm system and the front of the vertical farm system to recirculate water the water flow, whereby the water flow between the back of the vertical farm system and the front of the vertical farm system is through the second horizontal growing container.

20. The vertical farm system according to claim 1 whereby the first horizontal growing container is further comprised of at least one of a radiant cooling surface in thermal communications with the water flow, a water cooling channel, a plant nutrient delivery channel, a slot operable to receive the water flow from the second back horizontal extrusion.

21. The vertical farm system according to claim 1 whereby the first horizontal growing container is comprised of a back half and a front half whereby the back half nests into the front half, and whereby the back half is connected to a latch having at least a position that prevents the front half and the back half from separating during placement of the first horizontal growing container into the vertical farm system, a position that prevents the front half and the back half from separating during the removal of the first horizontal growing container except through an external device to unlatch the back half from the front half, and a position to maintain the back half above the front half when the first horizontal growing container is in the vertical farm system during its normal operations while at the first position.

* * * * *